United States Patent [19]
Kang

[11] Patent Number: 5,896,697
[45] Date of Patent: Apr. 27, 1999

[54] MOSQUITO DESTROYER

[76] Inventor: Shih-Hsiung Kang, P.O. Box 2103, Taichung, Taiwan

[21] Appl. No.: 08/885,863

[22] Filed: Jun. 30, 1997

[51] Int. Cl.[6] ........................................... A01M 1/10
[52] U.S. Cl. ................................. 43/133; 43/107
[58] Field of Search ............................ 43/107, 118, 122, 43/133; 119/6.5

[56] References Cited

U.S. PATENT DOCUMENTS 1,936,644  11/1933  Schroder ................................ 43/118 X
3,997,999  12/1976  Evans ......................................... 43/107

FOREIGN PATENT DOCUMENTS 335851  11/1992  Japan ........................................ 43/107

Primary Examiner—Robert P. Swiatek
Attorney, Agent, or Firm—Rosenberg, Klein & Bilker

[57] ABSTRACT

A mosquito destroyer including a container, an isolating mesh and a mesh tray, in which the container contains a predetermined amount of water. The isolating mesh is tightly connected with an open end of the container and a frame body is associated with the isolating mesh at the center thereof. The mesh tray is placed in the frame body and floats on the water surface. The female mosquito is induced to lay eggs on the mesh tray. After the eggs become larvas, the larvas will swim into the isolating mesh to grow up. After the larvas become mosquitoes, the mosquitoes are isolated by the isolating mesh and cannot fly out to sting humans and will die in the container.

1 Claim, 4 Drawing Sheets

MOSQUITO DESTROYER

BACKGROUND OF THE INVENTION

The present invention relates to a mosquito destroyer in which by utilizing the natures of the mosquitoes, the mosquitoes will naturally die at a fixed position.

With respect to the conventional mosquito destroyer or mosquito expellant such as vapor mat and electric vapor mat will radiate specific smell to kill the mosquitoes. A high voltage mosquito destroyer employs light for attracting mosquitoes and kills the mosquitoes with high voltage through a conducting body disposed around the light. Another type of mosquito expellant liquid or sonic mosquito expellant employs a liquid sprayed on the human body or sonic waves to expel mosquitoes. However, such measures can only expel the mosquitoes from human body or a certain area, while failing to effectively destroy the mosquitoes. Moreover, the mosquitoes are propagated very quickly, while the amount of killed mosquitoes is quite limited. Therefore, it is still impossible to completely destroy the mosquitoes.

SUMMARY OF THE INVENTION

It is therefore a primary object of the present invention to provide a mosquito destroyer in which by utilizing the natural characteristics (while laying eggs and growing up) of the mosquitoes, the mosquitoes will naturally die in a container without flying out to sting human body.

According to the above object, the mosquito destroyer includes a container, an isolating mesh and a mesh tray, wherein the container contains a predetermined amount of water. The isolating mesh is tightly connected with an open end of the container and a frame body is associated with the isolating mesh at the center thereof. The mesh tray is placed in the frame body and floats on the water surface. The female mosquito is induced to lay eggs on the mesh tray. After the eggs become larvas (or gnats), the larvas will swim into the isolating mesh to grow up. After the larvas become mosquitoes, the mosquitoes are isolated by the isolating mesh and cannot fly out to sting human body and will die in the container.

The present invention can be best understood through the following description and accompanying drawings, wherein:

DETAILED DESCRIPTION OF THE PREFERRED EMBODIMENTS

Figure 1:
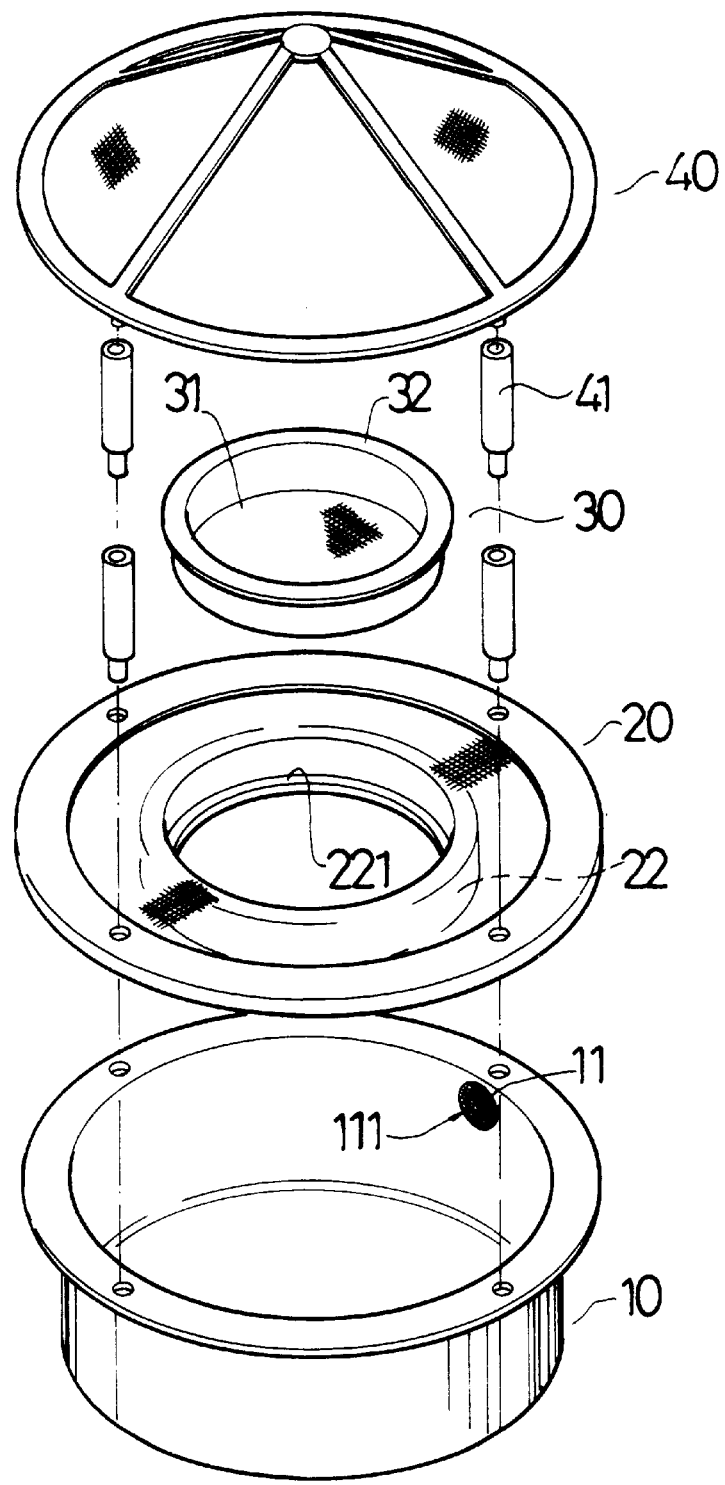
FIG. 1 is a perspective exploded view of the present invention.
Figure 2:
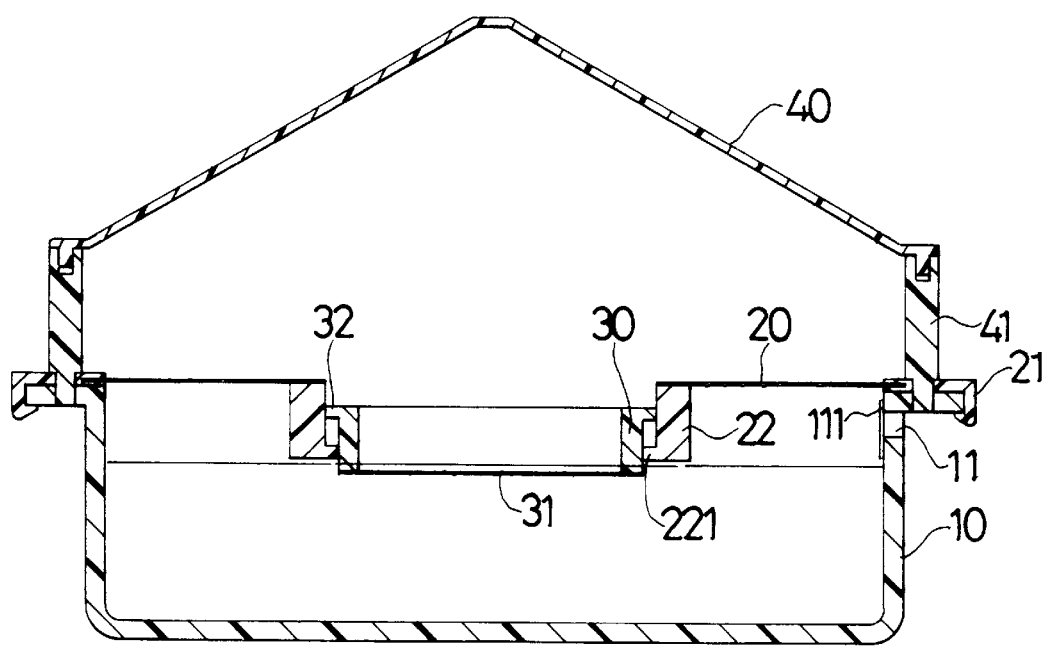
FIG. 2 is a sectional assembled view of the present invention.
Figure 3:
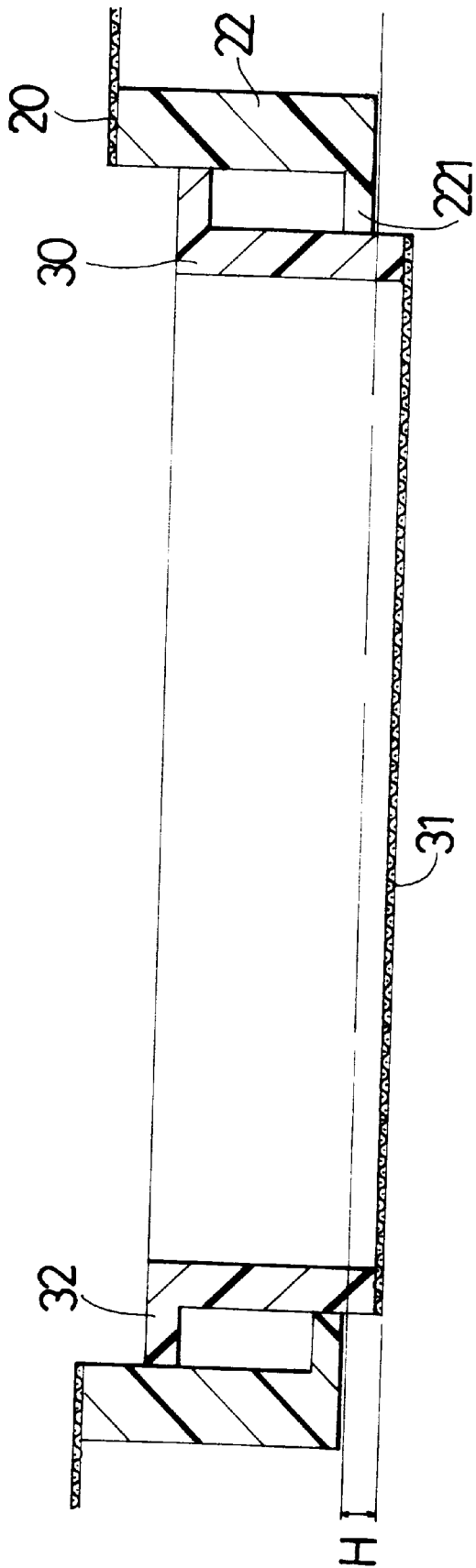
FIG. 3 is a partially enlarged sectional view according to FIG. 2.
Figure 4:
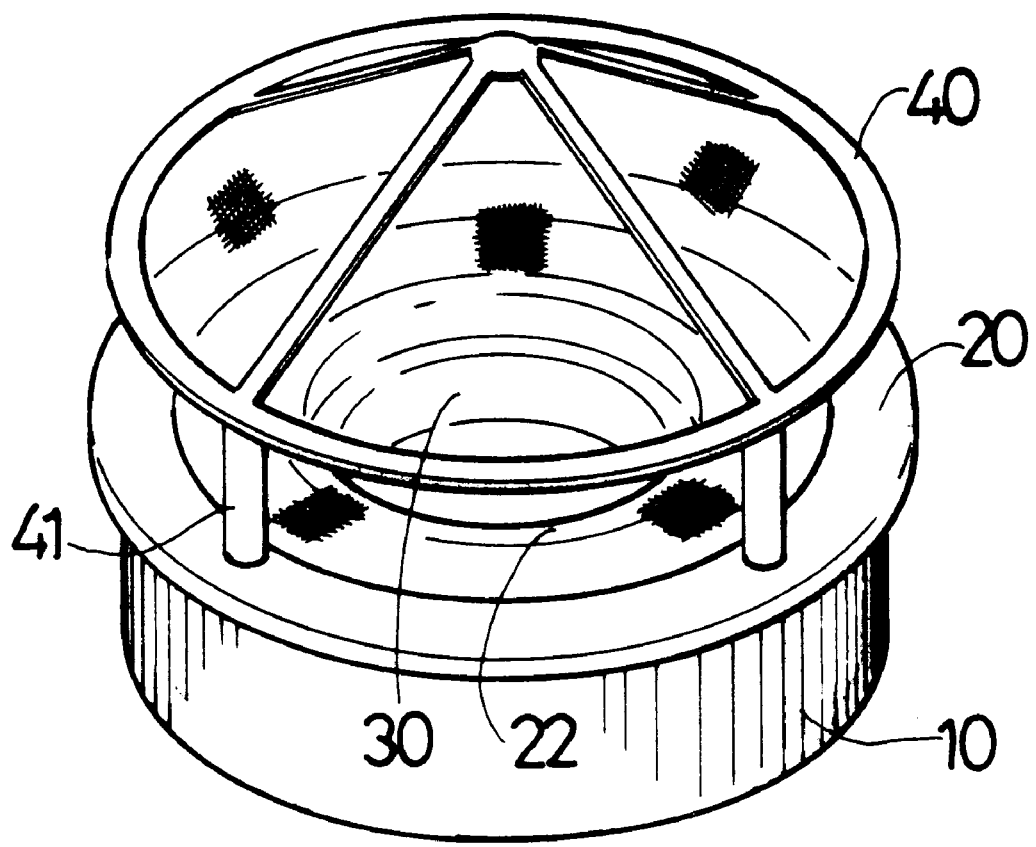
FIG. 4 is a perspective assembled view of the present invention.

Referring to FIGS. 1 to 4, the present invention includes a container 10, an isolating mesh 20, a mesh tray 30 and an upper cover 40.

At a certain height, the wall of the container 10 is formed with a draining hole 11 having a filter mesh 111.

The isolating mesh 20 is formed with annular latch groove 21 along the periphery for engaging with an open end of the container 10. A frame body 22 is associated with the isolating mesh 20. The inner side of the frame body 22 is provided with a flange 221.

The bottom of the mesh tray 30 is connected with a mesh face 31 with a density of 24 meshes per inch. The outer edge of the open end of the mesh tray 30 is formed with a stopper flange 32. The mesh face 31 is positioned at a height H about 4 mm below the water level.

The upper cover 40 is connected with support columns 41 disposed at the top end of the container 10.

When assembled, the latch groove 21 of the isolating mesh 20 is engaged with the open end of the container 10 to tightly associate the isolating mesh 20 with the container 10. The mesh tray 30 is placed in the frame body 22 of the isolating mesh 20. The upper cover 40 is supported by the support columns 41 at the top end of the container 10 to define a space between the upper cover 40 and the container 10.

It is known that mosquitoes like to lay their eggs on the water surface in a dark, warm and humid place. The eggs will become larvas (or gnats) of mosquito after several days. The breathing organ of each larva is at the tail so that the larva will face its head downward with its tail upright to swim and grow in the water. The larva will extend its breathing organ above the water surface for breathing every certain periods of time. After a certain time, the larva becomes a pupa living on left side of a wall habitually. When growing to a certain stage, the pupa becomes an imago, that is, the mosquito. At a temperature below 10° C. and above 40° C., the growing of the mosquito will completely stop and the mosquito will die. Therefore, in winter, the number of the mosquitoes is greatly reduced, while in spring and summer, the number of the mosquito is greatly increased.

According to the above characteristic of mosquitoes, when a certain amount of water is filled into the container 10, the mesh tray 30 will float on the water surface due to buoyancy. The weight of the mesh tray 30 itself makes the mesh tray 30 sink down 2–3 mm under the water surface. The upper cover 40 covers the isolating mesh 20 to define a dark space above isolating mesh 20, whereby females mosquitoes will be attracted to lay eggs on the mesh tray 30. After the eggs become larvas, the larvas will grow in the water of the mesh tray 30. Periodically, each larva must extend its breathing organ above the water surface for breathing. When the larva gradually grows up to feel that the depth of the water in the mesh tray 30 cannot provide protection, the larva will swim into the water through mesh for protection.

However, occasionally the larva still must extend its breathing organ out of the water. When the larva gradually such grows up that the larva cannot pass through the mesh of the mesh face 31, the larva will float and swim to the water in the container 10 at the upper end connecting with the isolating mesh 20 to continuously grow up. After the larva becomes pupa and further becomes mosquito, since the isolating mesh 20 is connected with the open end of the container 10 and the mesh tray 30 is placed in the frame body 22 of the isolating mesh 20, the mosquito cannot fly out of the container. After about one to three weeks, the mosquito will die in the container 10 without flying out to sting human bodies.

In the above structure, the container 10 can have a dark color to enhance the darkness of the entire body. In addition, a bait for attracting the mosquito can be placed in the water in the container 10 (such as fruit, soybean powder, etc.) to induce the mosquito to lay eggs on the mesh tray and reduce the possibility that the mosquito lays eggs in other sites. In the case that the mosquito destroyer is placed outdoors, the upper cover 40 serves to prevent debris from dropping into the mesh tray 30. Also, when rain water increases the amount of the water in the container 10 too much, the water will be automatically drained out from the draining hole 12. Therefore, the water level cannot become too high so the mesh tray 30 is floated away from the frame body 22 of the isolating mesh 20.

The filter mesh 111 of the draining hole 11 serves to prevent the larva or mosquito from flowing or flying out of the draining hole 11. In addition, when the water in the container 10 evaporates and the water level is gradually lowered, the flange 221 of the frame body 22 will abut against the stopper flange 32 of the mesh tray 30, whereby the mesh tray 30 will be lowered along with the water level until reaching a certain height. This avoids that a clearance is formed between the inner side of the frame body 22 and the outer side of the mesh tray 31, allowing a mosquito to fly out. The shape of the container 10 can be designed as necessary without specific limitation.

It is to be understood that the above description and drawings are only used for illustrating one embodiment of the present invention, and are not intended to limit the scope thereof. Any variation and derivation from the above description and drawings should be included in the scope of the present invention.

What is claimed is:

1. A mosquito destroyer comprising:

a container having an open end and a predetermined quantity of water therein;

an isolating mesh tightly coupled to said open end of said container, said isolating mesh including a frame body formed therein, said frame body having an opening formed therethrough and having a first flange formed on a perimeter edge of said opening; and, a mesh tray disposed in said opening of said frame body and floating on said water in said container, said mesh tray having (a) a second flange formed around an open end thereof for stopping against said first flange, and (b) a mesh face formed on a distal end thereof disposed a predetermined distance below a surface level of said water.

* * * * *